No. 684,988. Patented Oct. 22, 1901.
A. HORNER.
CANE BUNDLING DEVICE.
(Application filed July 24, 1901.)
(No Model.)
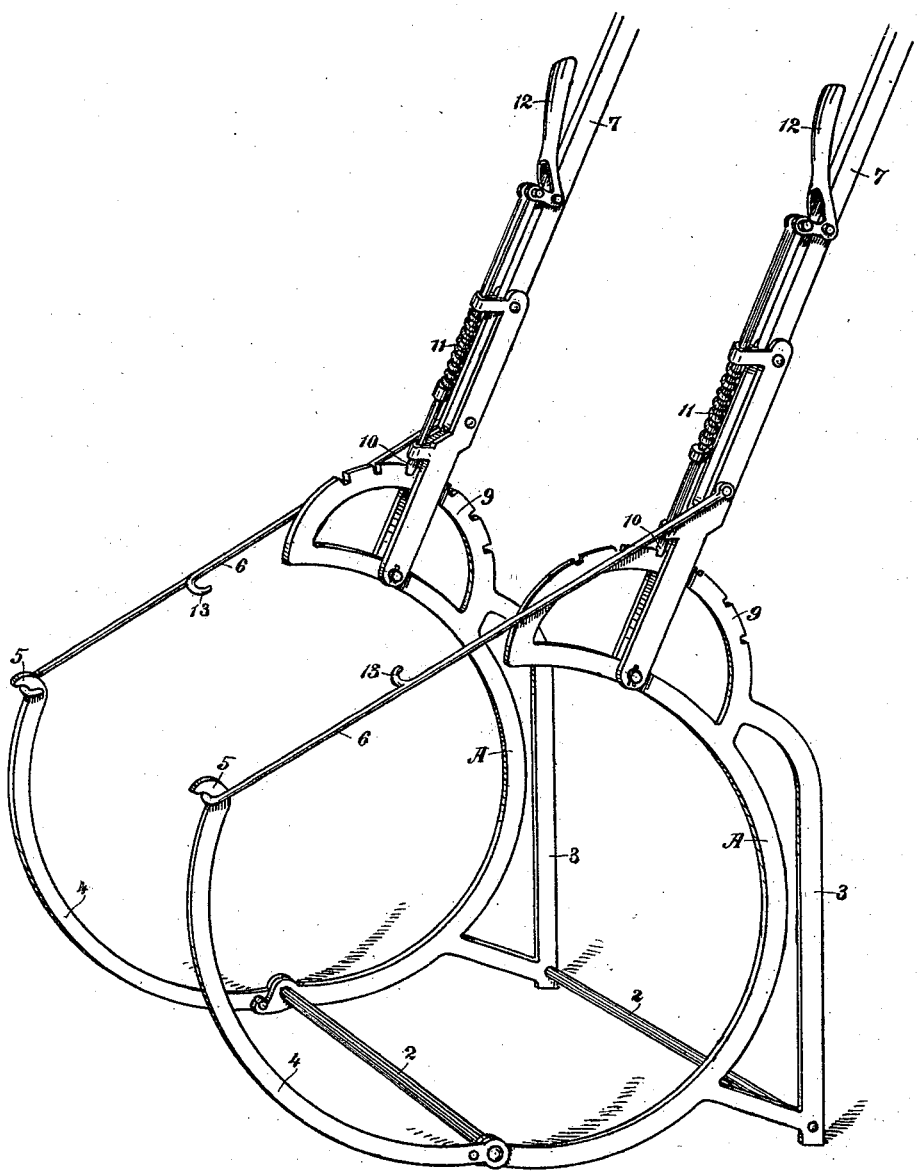
Witnesses,
Inventor,
Albert Horner
By Dewey Strong & Co.
Attys

UNITED STATES PATENT OFFICE.

ALBERT HORNER, OF PAAUILO, TERRITORY OF HAWAII.

CANE-BUNDLING DEVICE.

SPECIFICATION forming part of Letters Patent No. 684,988, dated October 22, 1901.

Application filed July 24, 1901. Serial No. 69,498. (No model.)

*To all whom it may concern:*

Be it known that I, ALBERT HORNER, a citizen of the United States, residing at Paauilo, Island of Hawaii, Hawaiian Territory, have invented an Improvement in Cane-Bundling Devices; and I hereby declare the following to be a full, clear, and exact description of the same.

My invention relates to a device which is especially designed for the collection into and the holding of bundles or packages of a sugarcane or like product, which can thus be gathered together and held in position for transportation or other purposes.

It consists in a hinged framework so curved or shaped as to be adapted to receive the cane, which can be laid into it, and a means for closing up the hinged portion with relation to the other part, so as to clamp the bundle firmly in place.

It also comprises details of construction, which will be more fully explained by reference to the accompanying drawing, in which the figure is a perspective view of the device.
For the manufacture of sugar the cane is first cut and must then be transported in various ways to the mills.

It is the object of my invention to provide a means for making packed bundles of convenient weight to be readily handled and transported.

As shown in the drawing, my invention consists of two segments A A, joined together by suitable bars 2, so that the segments stand sufficiently far apart to allow the cane cut in proper lengths to be laid into these segments and be properly supported thereby. The segments are here shown as provided with rearwardly-projecting legs 3, suitably connected with them and having such a length that the lower ends will rest upon the ground, while the front lower ends of the segments also rest upon the ground, thus forming a steady support. Hinged to the front lower ends of the segments A are other segments 4, the curvature of which is such that, with the segments A, they can be formed into sufficiently circular clamps to hold as large a body of cane or other material as may be desired, the quantity depending upon the size of the segments. The upper ends of the segments 4 are made hook-shaped or otherwise formed, as at 5, to provide for the attachment of the connecting-rods 6, by which they are closed about their hinges after the device has been loaded. The connecting-rods 6 extend across the upper part of the partial circle formed by the two segments and are connected with the lever-arm 7, which is pivoted to the segment A, as shown at 8.

9 is a segmental notched rack, and the notches upon it may be engaged by a sliding pawl 10, carried upon the lever 7 and actuated by a spring 11, which will cause it to drop into either of the notches of the rack when it arrives in line therewith. The pawl is released from any notch to allow the lever to be moved by means of a fulcrumed handle 12, carried at a convenient point upon the actuating-lever 7.

The connecting-rods 6 are provided with a series of hooks 13, sufficiently spaced, and the operation will then be as follows: The rods 6 are temporarily removed or thrown back out of the way, and the segments A resting upon their lower ends the ends of the legs 3 will be properly supported, while the segments 4, hinged thereto, will curve outwardly, leaving a wide space at the top, into which such a quantity of cane as may be desired is placed. The levers 7 are then thrown forward, and the rods 6 are hooked into the connections 5 of the movable segments and the levers are thrown back. This pulls the segments 5 about their fulcrum-points, thus closing in upon the body of cane, and when the levers have moved the segments as far possible the pawls 10, engaging the segment-rack, will hold the parts in position. Wires, chains, or cords are then passed about the bundle and secured so as to hold it at its then state of compression. If it is desired to further compress the bundle, the levers are thrown forward and the next succeeding hooks 13 are engaged with the points 5 of the movable segments and the levers again thrown back. The binding wires, cords, or chains can then be taken up to fit the reduced size of the bundle and the operation thus carried on until the bundle is in as compact a state as may be required. It is then in readiness for transportation by traveling carriers of any description. Such bundles may be made up of any desired size and weight.

For work on sugar plantations it is found that bundles of two or three hundred pounds is very satisfactory, but there is no special limitation to the size that can be made for this purpose. The bundles may then be lifted by a suitable derrick or hoisting apparatus by means of sling chains and connecting hooks or devices and delivered to the wagons, endless rope, or other carrier which is to be employed in transporting them.

Having thus described my invention, what I claim as new, and desire to secure by Letters Patent, is—

1. A bundling device comprising segments connected to stand in parallel planes and having rear supports adapted to contact with the ground, other segments hinged to the forward portions of the first-named ones and curved to continue the circular form of the bundle-receiving frame, levers pivoted to the first-named segments and means connecting the levers with the outer ends of the second-named segments whereby the latter are closed upon the other segments to inclose and compress the material.

2. The combination in a bundling device of segments connected together to stand parallel with each other having legs by which they are supported, other segments hinged to the lower ends of the first-named segments and curving to form an inclosure into which a body of material to be bundled is placed, levers fulcrumed to the first-named segments, rods connecting with said levers and having detachable connection with the points of the movable segments whereby the latter may be moved around their hinges to compress the contained bundle, said rods having supplemental connections between their ends for effecting a further compression of the bundle.

3. The combination in a bundling device of segments connected to stand in parallel planes and having rearwardly-projecting supporting-legs, other segments hinged to the outer ends of the first-named segments and curved to continue the circular form whereby a receptacle is formed into which the material to be bundled is placed, levers fulcrumed to the rear upper ends of the first-named segments, with pawls and holding ratchet mechanism, rods pivoted to said levers extending forwardly, and having hooks or means for connecting them with the free ends of the movable segments whereby the latter may be turned about their fulcrum-points to compress the bundle contained within them.

In witness whereof I have hereunto set my hand.

ALBERT HORNER.

Witnesses:
F. B. WEEKS,
A. J. CAMPBELL.